(12) United States Patent
Meher-Homji et al.

(10) Patent No.: US 7,204,670 B1
(45) Date of Patent: Apr. 17, 2007

(54) WATER REMOVAL FROM A COMPRESSOR AIR INLET DUCT

(75) Inventors: Cyrus B. Meher-Homji, Sugarland, TX (US); Thomas R. Mee, Monrovia, CA (US)

(73) Assignee: Mee Industries, Inc., Monrovia, CA (US)

( * ) Notice: Subject to any disclaimer, the term of this patent is extended or adjusted under 35 U.S.C. 154(b) by 3 days.

(21) Appl. No.: 10/679,820

(22) Filed: Oct. 6, 2003

Related U.S. Application Data

(60) Provisional application No. 60/416,645, filed on Oct. 7, 2002.

(51) Int. Cl.
*F01D 5/32* (2006.01)
*F04D 29/00* (2006.01)

(52) U.S. Cl. .......................... 415/1; 415/115; 415/116; 415/169.2; 415/169.3

(58) Field of Classification Search .................... 415/1, 415/115, 116, 169.2, 169.3, 169.4; 60/39.53, 60/728; 55/319, 423, 467, DIG. 17; 4/209 FF, 4/211, 218, 219, 351
See application file for complete search history.

(56) References Cited

U.S. PATENT DOCUMENTS

| 1,400,813 | A | * | 12/1921 | Graemiger | ...................... 415/1 |
| 2,469,678 | A | * | 5/1949 | Wyman | ..................... 60/39.53 |
| 4,133,060 | A | * | 1/1979 | Webb | ............................. 4/216 |
| 5,669,217 | A | * | 9/1997 | Anderson | ..................... 60/775 |
| 6,273,674 | B1 | * | 8/2001 | Charron | ................... 415/169.3 |

* cited by examiner

*Primary Examiner*—Christopher Verdier
(74) *Attorney, Agent, or Firm*—William W. Haefliger

(57) ABSTRACT

The air duct leading to a compressor for a gas turbine or the like often has water accumulating on walls and other structures. Water is removed from the compressor air inlet duct by drains connecting to the inside of the duct, including horizontal and vertical walls and the lower wall or floor of the duct. Drains are also provided on hollow structures such as struts, air inlet cone and inlet guide vanes upstream from the compressor. A suction pump or blower lowers pressure in the drain(s) to a pressure less than air pressure in the duct adjacent to the drain outlet for positively sucking water from the drain.

26 Claims, 5 Drawing Sheets

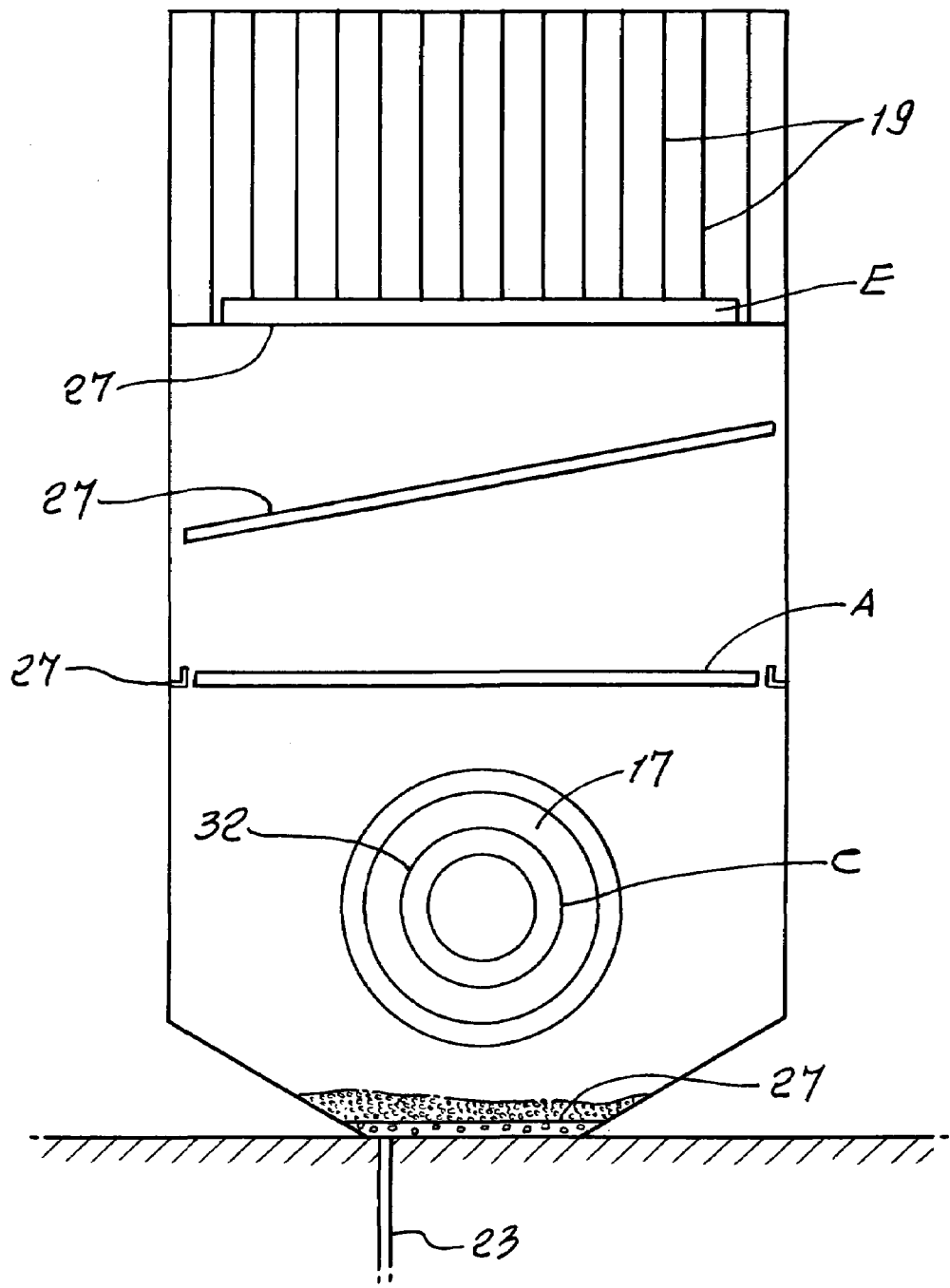

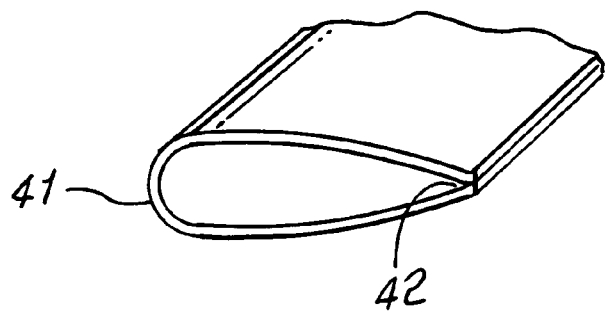
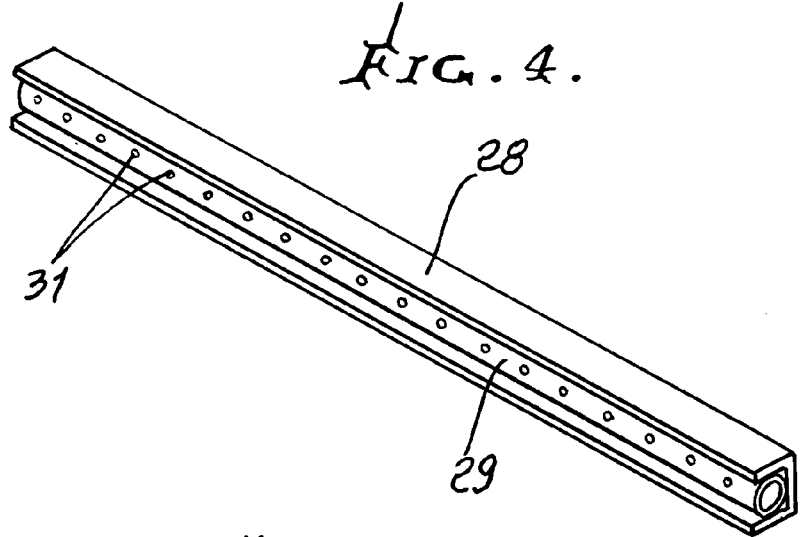
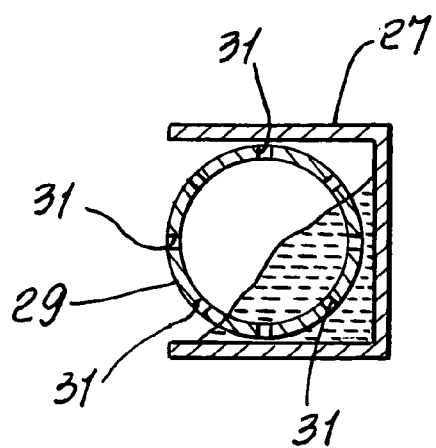

WATER REMOVAL FROM A COMPRESSOR AIR INLET DUCT

CROSS-REFERENCE TO RELATED APPLICATION(S)

This application claims benefit of the filing date of U.S. Provisional Patent Application No. 60/416,645, filed Oct. 7, 2002.

FIELD OF THE INVENTION

The subject matter of the Provisional Application is hereby incorporated by reference.

This invention relates to gas turbines and the like with an axial flow or centrifugal compressor and means for introducing water droplets into an air duct to the compressor. The invention provides means for avoiding or at least minimizing incidental water ingestion into the compressor. It is also useful for any process compressor, and to centrifugal, axial or mixed flow compressors used for gas turbine applications, or for gas or air compression applications for other purposes such as gas liquefaction or other movement of air or gasses. The description is of an example for a gas turbine installation.

BACKGROUND

A popular power augmentation system for gas turbines is inlet fogging. In an inlet fogging system, fine droplets of demineralized water are sprayed into the intake duct of the compressor stage of the gas turbine and evaporate and cool the inlet air. The amount of water injected can be controlled to arrive at approximately saturation conditions at the compressor inlet (thus, attaining or nearly attaining the wet bulb temperature) or may include the deliberate injection of a higher amount of water with the specific objective of allowing fine droplets (sized below about 20 microns) to enter the compressor, thus allowing fog intercooling and a further boost of power and improvement of efficiency.

Regardless of the efficiency of the fog nozzles and the atomization process, free water tends to pool on the floor of the duct near the bell mouth of the compressor, and also strike the duct walls, structures within the duct, and the intake cone of the gas turbine compressor. The water that deposits from the fog droplets tends to grow in drop size, or create streams or puddles, and can be suctioned into the compressor as larger drops where it could cause potential erosion damage to the compressor blading.

A current method of avoiding the damage caused by free water is by the use of strategically placed drains that are provided with P-traps or one way flapper valves which essentially will allow water to drain out of the duct when a certain head of water accumulates. A problem with this is that the activation of the trap or flapper will, by definition, call for some collection of water. Thus, prior to the drain activating, some ingestion of water can occur. Further, the currently used drain approach does not address sheets of water on walls or other structures, that are literally sucked into the compressor due to rapid air flow and compressor suction pressure which can be as high as 165 cms of water (below ambient).

The suction pressure of an axial flow compressor may cause sheeting of water on various surfaces surrounding the intake bell mouth including vertical duct walls, the compressor intake cone, the floor of the duct, intake support struts, and the bell mouth. This water then accumulates and is sucked into the compressor. At times it adheres to the intake support struts, or inlet guide vanes (IGVs) and then gets ingested. As the droplet sizes are much larger than the original fog droplets, these ingested droplets can cause blade erosion or other aerodynamic problems. At times severe ingestion can cause casing distortion of the compressor housing and even blade tip deformation.

The invention is focused on minimizing the amount of water that can cause such problems. With the use of inlet washing systems the potential for similar wetting and ingestion of larger droplets exists. This invention can be used for minimizing this problem in addition to fogging applications and may also apply to applications with media evaporative coolers or chillers where large droplets can be formed due to either carryover or by condensation in the duct.

SUMMARY OF THE INVENTION

There is, therefore, provided in practice of this invention, method and apparatus for removing water from compressor inlet air comprising, for example, a drain connecting to the inside of the duct; and means for lowering pressure in the drain to a pressure less than air pressure in the duct adjacent to the drain.

BRIEF DESCRIPTION OF THE DRAWINGS

FIG. 3 is a schematic view of the air duct of FIG. 2 in a direction parallel to the compressor shaft.

FIG. 4 is a perspective view of an exemplary suction strip and drain applied within the air duct.

FIG. 5 is a transverse cross-section through a suction strip.

FIG. 7 is a fragmentary perspective and cross section of a hollow strut or guide vane.

DESCRIPTION

Figure 1:
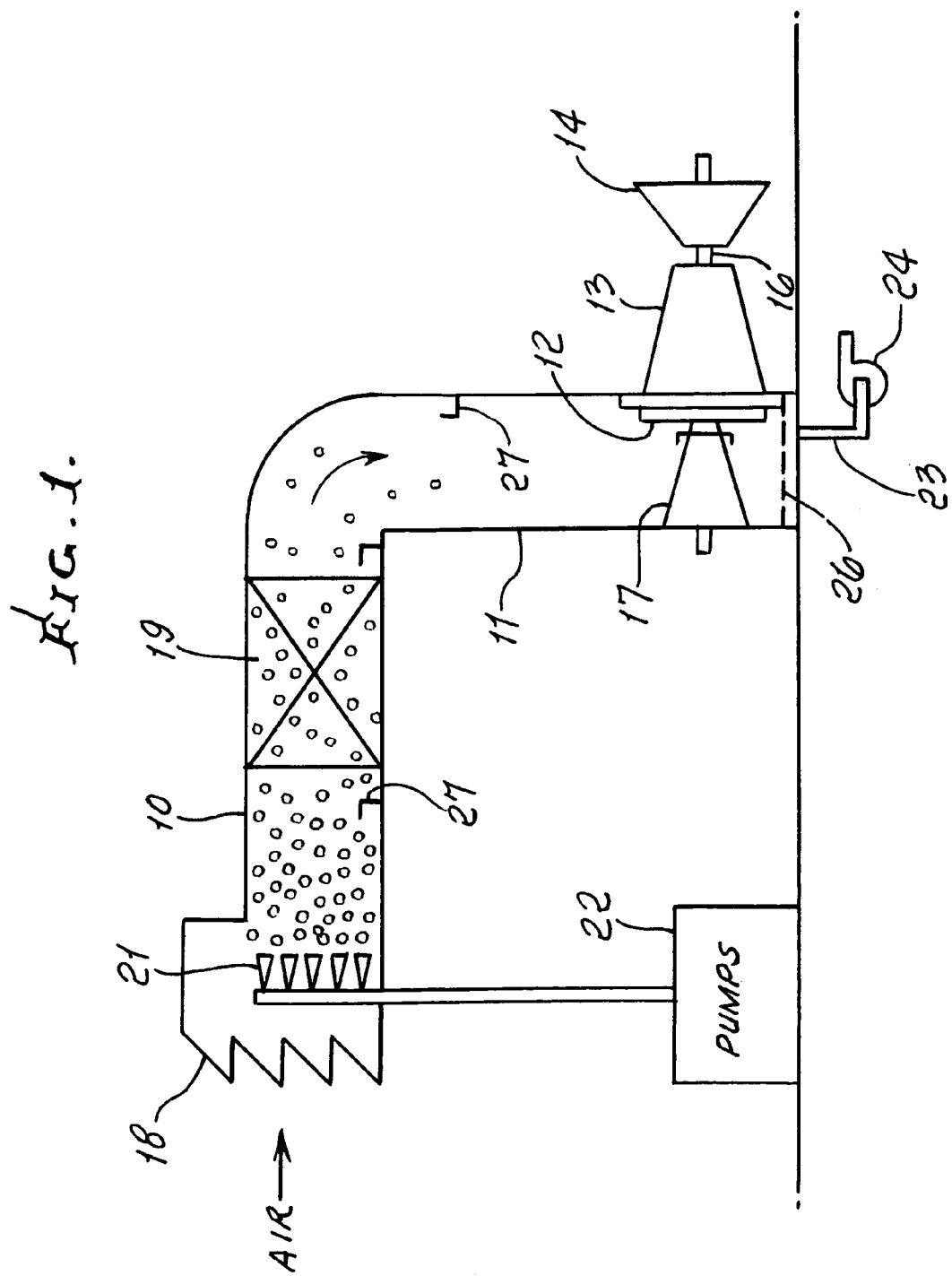
FIG. 1 is a schematic side view of an inlet air duct to a compressor with drains in place.

It is a feature of the present invention to apply suction to drain lines in the air inlet duct to an air compressor such as the compressor stage of a gas turbine. This is useful when the inlet air is humidified by injection of water droplet fog or during overspray or with media type evaporative coolers for enhancing turbine output. The suction lowers the pressure in the drain(s) to a pressure less than the air pressure in the duct near the drain. This draws water and air into the drain to remove it from the duct. In addition to a drain in the floor of the duct, it can be desirable to provide drains near the fogging nozzles, on horizontal runs in the inlet duct, on vertical or near-vertical walls of the duct, on the inlet cone to the compressor and/or around at least a portion of the bell mouth of the compressor. Drains may also be deployed on inlet guide vanes and silencer walls and various support struts within the air duct.

An exemplary air intake duct for a gas compressor such as the first section of a gas turbine has a horizontal portion 10 nearer the air inlet and a more or less vertical portion 11 leading down to the bell mouth 12 of the compressor inlet. The gas turbine has a compressor section 13 connected to a turbine section 14 by a shaft 16. Where the gas turbine is used in a power plant, for example, the shaft continues through an inlet cone 17 in the air duct to a generator (not shown). There are also configurations of a compressor without an inlet cone, and other aspects of the suction drain system remain applicable.

Air enters the duct through rain baffles, trash screens, and the like 18 at the inlet end of the duct. The air passes through the horizontal section between silencer walls 19 and then turns downwardly through the vertical section 11 toward the inlet cone, bell mouth and compressor. This invention is particularly useful when employed with a system that adds a very fine "fog" of water droplets to the inlet air for humidification and/or overspray. Thus, there is a manifold 21 of a large number of fog nozzles which inject very fine (e.g. 20 microns) droplets of water into the air stream. Ordinarily, several manifolds of nozzles are employed, connected to high-pressure pumps 22 for controlling the quantity of water added into the inlet air fog. This much of a gas turbine and air duct installation is conventional.

In such a system, water accumulates on various surfaces within the air duct due to impact of liquid water droplets or condensation of water vapor on the surfaces. For example, near the fog nozzles, relatively large water droplets may fall to the floor of the horizontal section. Fog droplets impact on silencer walls and may drain to the floor of the horizontal section or may sometimes be swept off the silencers by air flow in the form of larger droplets which may fall to the floor of the horizontal portion or be carried around the turn to fall on the floor of the air duct at the bottom of the vertical portion or to enter the compressor as large, un-atomized droplets. Fog droplets may impact on the horizontal and vertical walls of the air duct and drain downwardly or are swept along by the air stream. Fog droplets impact on the inlet cone and since their velocity is high in this region impacted or condensed water may be swept into the compressor. Water droplets may also impact on and wet the surfaces of the inlet guide vanes and bell mouth of the compressor. There are also struts and supports in the air duct such as, for example, the [usually three] struts that support the inlet cone. Fog droplets may impact on these surfaces as well. In effect, it can be said that almost all of the surfaces and structures in the inlet air duct may be wet.

One significant source of water which may be ingested into the compressor in many systems is the floor of the air duct just outside the bell mouth inlet to the compressor. A conventional floor drain 23 is in the floor. A pump 24 or other conventional means is connected to the drain for lowering pressure in the drain below the pressure in the air duct. It is also desirable to place a perforated plate, screen or slotted sub-floor 26 over the floor and drain to minimize the possibility of suctioning sheets of pooled water off of the floor of the duct into the inlet of the compressor. Any water falling or draining onto the floor of the vertical section of the duct is sucked into the drain and does not collect to be drawn into the compressor. Such a screen may not be needed across the entire floor of the duct, only nearer the compressor inlet where water accumulation is more likely to be ingested.

Figure 2:
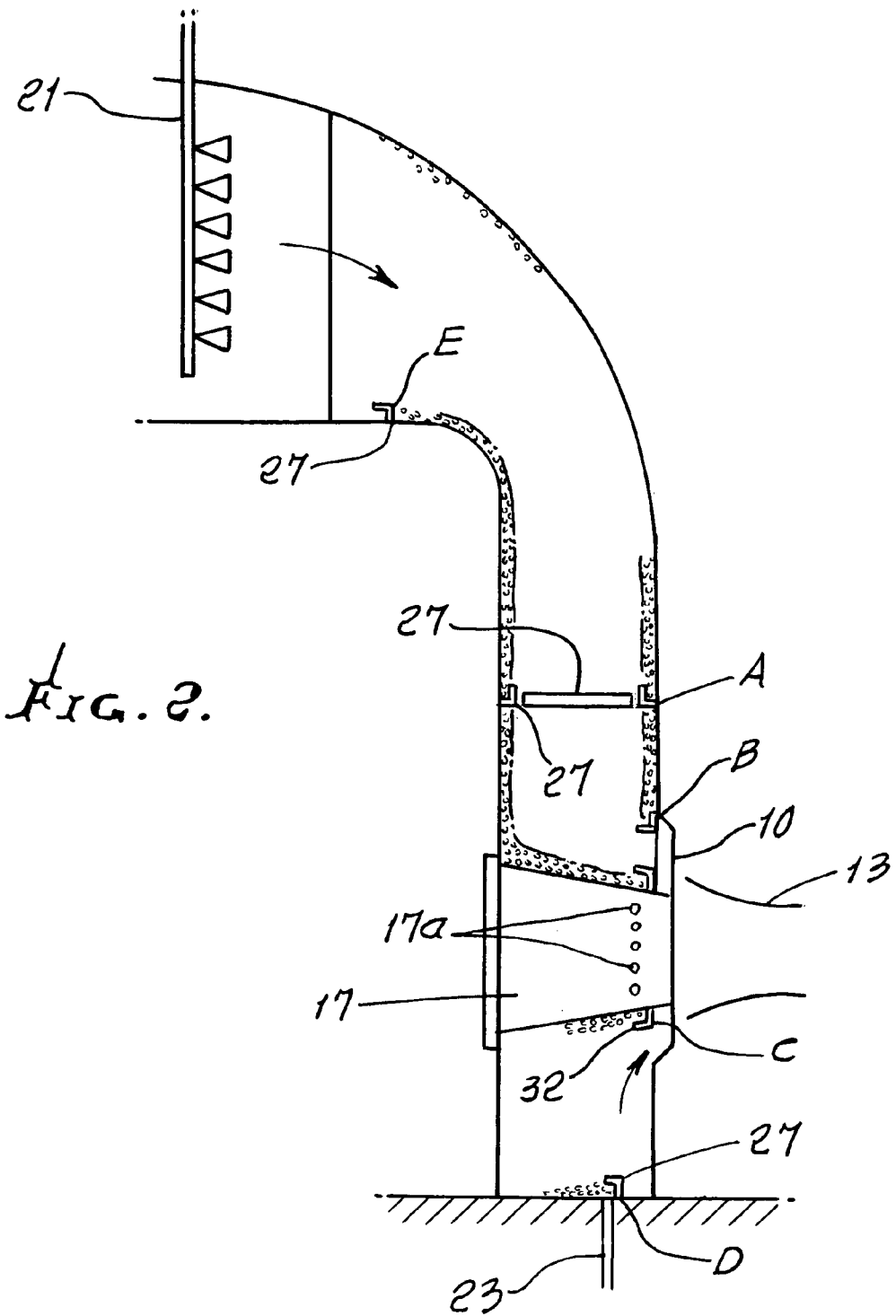
FIG. 2 is another schematic side view of an inlet air duct with drains and suction drain strips in place.
Figure 6:
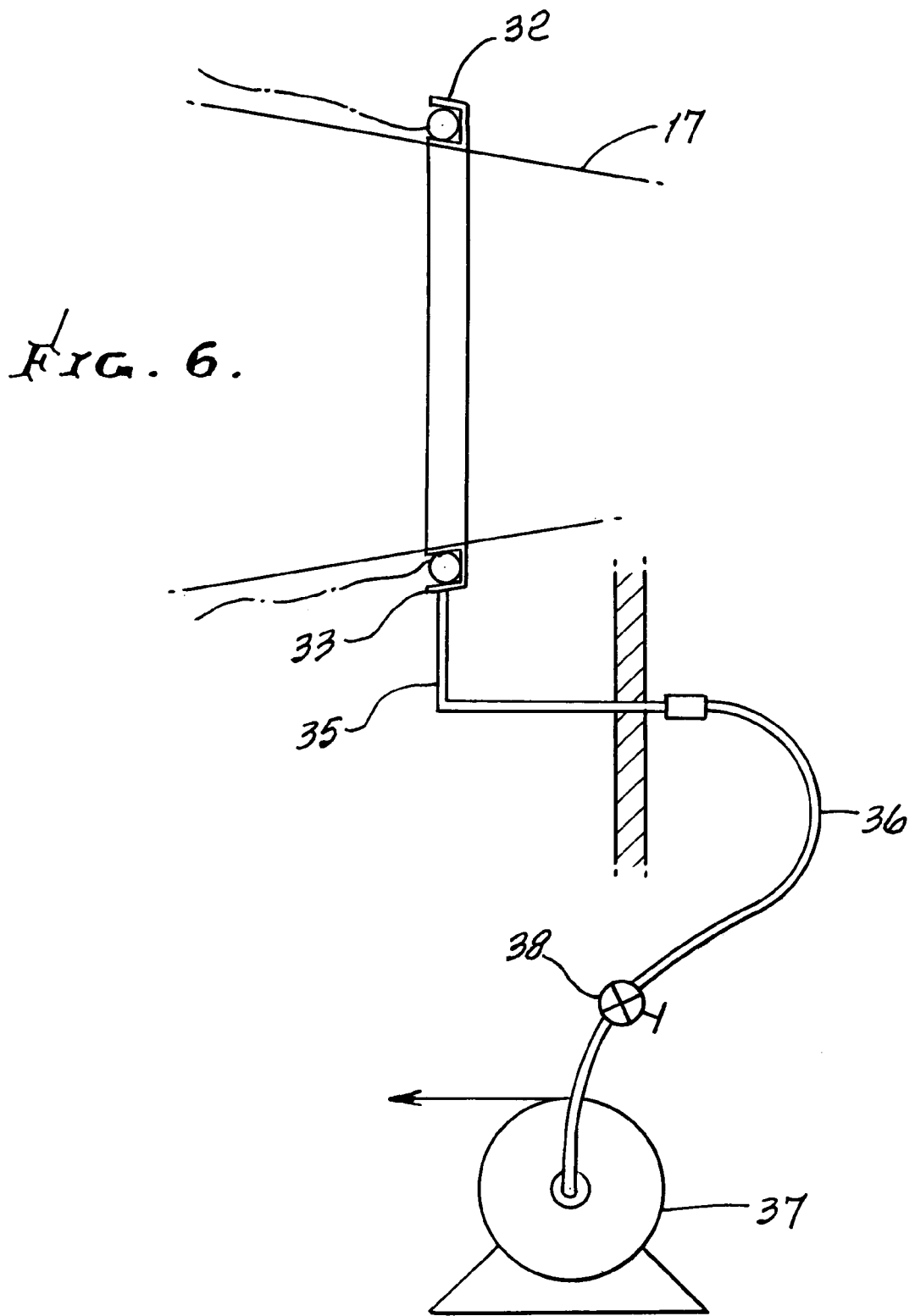
FIG. 6 illustrates a suction ring on the intake cone for a gas turbine compressor, as well as a suction pump.

Water that collects on the walls of the air inlet duct is removed by suction drain strips on the walls at locations indicated in FIGS. 2 and 3. For example, a suction strip 27 is in a horizontal portion of the duct at location E downstream from silencer walls and/or nozzle manifolds. Suction strips 27 are provided around the walls of the vertical section of the duct at location A. In this embodiment, a suction strip 27 is placed on the floor of the vertical section at a location D near the compressor inlet. A more conventional floor drain may be used here, too, either in lieu of the strip (as in FIG. 1) or in addition to the suction strip. In addition, a suction ring 32 as illustrated in FIG. 6 is placed around a downstream, smaller diameter portion of the intake cone at location C.

A roughly semicircular suction drain strip in the form of a half ring may also be used at location B around the bell mouth of the compressor. A half ring suction strip around the upper portion of the bell mouth appears sufficient, although it may be desirable to use a complete ring in some embodiments. In some compressor inlet configurations, such a suction drain around part of the bell mouth may not be needed. In fact, in specific air inlet ducts some of the illustrated suction drain strips may not be needed, or additional drains may be desirable in longer runs of a duct. Similar suction strips may be applied to silencer surfaces, as well. The location of suction strips is determined by the expected or observed trajectory of water droplets, so as to collect the flow as well as suction the water from the duct.

Each of the suction strips is connected to a pump or pumps (or suction blowers) which lower pressure in the strip to less than the pressure in the adjacent portion of the duct. One pump or separate pumps may be used as is convenient for a specific installation.

The locations of the suction drain strips are shown schematically in FIGS. 2 and 3 since they may be located differently for different air duct configurations. Where best to place such suction drains is readily determined by visual observation of where water tends to accumulate on walls, floors, struts, etc., or by analysis of air flows in a duct or computation fluid dynamic software programs or the like when planning a new installation. Suction drains are best placed where they will interrupt water draining downstream in the duct. Sufficient drains are placed so that individual drain lines can handle all of the water accumulating at that location.

FIGS. 4 and 5 illustrate a typical suction drain strip. Such a strip has a stainless steel member 28 with a C shaped or U-shaped cross section. A stainless steel (or plastic) tube 29 lies within the C-shaped cross-section. One millimeter diameter holes 31 are formed through the walls around the circumference of the tube and along its length. An exemplary tube has a diameter of about one centimeter, a little smaller than the inside width of the C-shaped strip. Other sizes and shapes may be used, depending on the duct configuration and flow of water expected. The holes are drilled about a centimeter apart along the length of the tube and holes around the circumference may be in circumferential bands or may be offset in a spiral pattern around the tube. Although holes are illustrated every 45 degrees around the tube in the cross sectional drawing, fewer holes only nearer parts of the C-shaped cross-section where water tends to accumulate may be sufficient. An excess of holes may leave them sucking nothing but air and necessitate a larger exhaust system. Water flowing into the C-shaped strip by gravity or by air flow through the duct is sucked into the tube and removed to an exhaust system.

It should be apparent that desirable dimensions and locations will vary depending on the specific application. All that is needed is that the strip, tube, holes, etc., are strategically placed in locations where flowing water is expected to accumulate and that they are adequately sized for the expected water flow rate. Larger dimensions may be used where water flows are predicted or observed to be higher there is seen to be appreciable water, and smaller sizes where less water flow is observed or predicted.

The C-shaped member along the wall of the duct acts as a dam to collect water flowing along the wall of the duct and direct that water to the drain tube. A generally Z shaped cross section or more streamlined shape is considered equivalent, as are V- or L-shaped cross sections that, in effect, have a wall downstream from the tube and an adjacent wall for attachment of the drain strip to the wall of the duct.

The suction ring around the inlet cone is similar, with a stainless steel ring or dam 32 having a C shaped cross section secured to the outside of the cone. The suction ring should be small enough and shaped aerodynamically so that it has minimal or no interference with air flow into the compressor. Designs can be checked in a wind tunnel and/or with computation fluid dynamics software. A circular perforated tube 33 lies in the stainless steel ring for sucking water from within the C-shaped cross section. The half-ring around the bell mouth is, in effect, the same.

Alternatively, the cone, or at least a downstream portion of its surface, is made of a porous metal. Suction is applied within the cone to suck water through the pores of the cone surface. Perforations in the wall of a conventional cone can also be used, with a small suction manifold inside the cone opposite the holes for drawing water through the wall into the cone. See perforations 17a. Using perforations or porous metal for drawing water to the interior of the one is desirable since the ring on the outside may unduly interfere with smooth air flow. The cone is an important location for a suction drain since water does not drain from the cone by gravity and is likely to be ingested into the compressor.

Instead of a strip with a suction drain tube embedded along its full length, one may use a U- or V-shaped stainless steel strip or the like connected to the wall to extend diagonally across the air flow. Water flows along such a strip to a suction drain opening 25 or openings near a downstream end of the strip. This works quite well in a vertical section of the duct where gravity and air flow cooperate to drain water from a face of the duct to a corner of the duct, for example, where a suction drain draws water from the strip to an exhaust system. This can be economical retrofit in a duct. It may also permit use of narrower strips in greater number for less disturbance of air flow.

The strip is connected to the wall of the duct, the cone or other structure by any conventional means. The connection may be permanent, such as by tack welding, or may be removable with conventional fasteners.

A stainless steel (or plastic) tube 35 is connected to the tube in the ring and extends through the wall of the air inlet duct. This is connected in turn by a rigid or flexible tube 36 to an exhaust system illustrated in this embodiment as simply a centrifugal blower 37 which can handle air and air/water mixtures. It is the purpose of the exhaust system blower to reduce the pressure in the drain tube 33 (for example) so that it is less than the air pressure in the duct outside of the tube. A large pressure difference is not needed, so a manual metering valve 38 may be provided in the suction line to the blower for adjusting the pressure (or suction) in the drain tube.

Similar connections (not illustrated) are made between the exhaust system and each of the suction drain tubes 27 installed in the air duct. Each such connection may include a separate metering valve, since different pressures may be desirable in the different drain lines to assure that water is reliably removed and no great excess of air is drawn into the exhaust system. By observing the behavior of fog water and "condensed" water through a viewing window, the valves can be adjusted for optimizing the flows and maximizing the efflux of water from the different locations. Once the flows are optimized, the valves may be locked into position.

The exhaust system for the suction drain strips is indicated largely schematically, since any of a broad variety of suction devices may be used. For temporary usage, one may use something as simple as a shop vacuum which can suck up air and water. For more long term usage, one may employ a similar system with a cyclone separator to remove much of the water from a stream of air, and centrifugal blowers to induce air flow. Alternatively, one may use a steam ejector, since surplus steam is often available in gas turbine power plants. A steam ejector is a device where a stream of steam flows through a venturi and the resulting low pressure draws fluid through a lateral hole in the wall of the venturi. A steam ejector may be used with compressed air as the driving fluid. A water ejector where water is the motive fluid in the venturi may also be suitable. Thus, any of a broad variety of vacuum pumps which are commercially available may be selected for lowering the pressure in the drain tubes.

It may also be desirable to employ suction drains on the inlet guide vanes to the compressor or the inlet struts which support the compressor housing. This may take the form of a hollow leading or trailing edge on the guide vanes with perforations or a porous surface for admitting water from the outside of the guide vane. Air velocity is high in this region, as well as around the inlet cone, and greater care should be taken to avoid disruptions of airflow patterns that would cause aerodynamic excitation of the gas turbine compressor or otherwise impede efficient operation. Other support struts in the inlet duct, which support the duct walls and/or ceiling can also be fitted with suction drains so that any water which may collect is suctioned away before it can shed off as larger droplets.

The sizes of the rings and strips are kept small enough and properly shaped to avoid flow breakaway problems (for example, a large square suction drain strip would not be located near the inlet guide vanes where the velocity is in the neighborhood if 200 m/sec). Similarly, the tubing from the suction drains to outside the duct should be routed close to the duct walls so a to not interfere with airflow.

Hollow struts with perforated or porous walls running across the duct to support the inlet cone or other structures may be used for removing water accumulating on such struts due to impact of fog droplets. Such a strut may have a cross section quite like a suction strip as illustrated in FIG. 5 with a perforated tube in a C-shaped stainless steel structural member.

Alternatively, (FIG. 7) a strut may be a stainless steel sheet 41 roll formed into a streamlined shape with a "leaky" downstream edge 42 where the edges of the sheet meet but are not welded together. A hollow extruded shape may be employed with perforations punched through the wall for sucking water into the strut to a suction drain outlet at one end, preferably a lower end so that gravity assists in draining water to the suction outlet.

Similar structure of a roll formed shape as illustrated in FIG. 7 may be used for an inlet guide vane. A suction drain line is connected to the hollow interior of the blade. Several blades are typically connected to a suction manifold instead of employing separate drain lines for the multitude of inlet guide vanes of most turbines. A porous vane surface with the interior of the vane connected to a suction drain line or manifold is preferred. All of the vane surface may be porous or perforated, or only a downstream portion may be used for sucking water from the surface since this is the most wetted portion.

Similarly, suction strips or porous surfaces may be employed toward the downstream end of silencer walls for removing water that may accumulate on such walls and be swept along by the airflow instead of draining to the floor.

Suction drains may be used in low spots in the duct and in locations where water vortexes may cause liquid to be ingested.

A feature common to each of these drains is lowering of pressure in the drain tube, opening or passage to a pressure that is less than the air pressure in the duct adjacent to the drain openings. This positively withdraws water from the inside of the duct so that it is not ingested into a compressor. The amount of air sucked from the air inlet (duct, cone, vanes, etc.) to the compressor is trivial since the volume of air flowing through the compressor is quite large.

Preferably the drain suction system has a simple control system that interlocks with the fogging (or other) system so that the drains start up prior to the initiation of adding water.

In the above description it will be understood that the drain may comprise a dam around at least a portion of the cone; that only a downstream portion of the inlet cone may be porous or perforated; and that at least a portion of the floor of the duct may be shielded with a perforated sheet or screen.

In addition to the benefits and safety mentioned above, a peripheral benefit is that the collection of water via suction drains permits testing for pH and contaminants. This may provide valuable information as to how effectively the inlet air filtration and water purification systems are operating.

While the invention has been described in connection with what is presently considered to be the most practical and preferred embodiment, it is to be understood that the invention is not to be limited to the disclosed embodiment, but is intended to cover various modifications and equivalent arrangements included within the spirit and scope of the claims.

What is claimed is:

1. Apparatus for removing water from compressor inlet air comprising:
   a compressor;
   an air inlet duct to the compressor;
   a drain connecting to the inside of the duct;
   a dam extending into air flow through the duct for directing water toward the drain, wherein the dam comprises a strip with a perforated tube in the strip; and
   means for lowering pressure in the drain to a pressure less than air pressure in the duct adjacent to the drain.

2. Apparatus for removing water from compressor inlet air comprising:
   a compressor;
   an air inlet duct to the compressor;
   a drain on a non-horizontal wall portion above the bottom of the air duct connecting to the inside of the duct; and
   means for lowering pressure in the drain to a pressure less than air pressure in the duct adjacent to the drain, and further comprising a dam extending into air flow through the duct for directing water toward the drain.

3. Apparatus for removing water from compressor inlet air comprising:
   a compressor;
   an air inlet duct to the compressor;
   a drain connecting to the inside of the duct, and a dam extending into air flow through the duct for directing water flowing toward the dam, and wherein the dam comprises a strip with a perforated conduit in the strip; and
   means for lowering pressure in the drain to a pressure less than air pressure in the duct adjacent to the drain.

4. Apparatus according to claim 2 wherein the dam comprises a strip extending diagonally across the duct and wherein a drain is near the lower end of the strip.

5. Apparatus for removing water from compressor inlet air comprising:
   a compressor;
   an air inlet duct to the compressor;
   a drain connecting to the inside of the duct, wherein the drain is located on a compressor inlet cone within the inlet air duct, and
   means for lowering pressure in the drain to a pressure less than air pressure in the duct adjacent to the drain.

6. Apparatus according to claim 5 wherein the drain comprises a dam around at least a portion of the cone and a perforated tube adjacent to the dam.

7. Apparatus according to claim 5 wherein the drain comprises a hollow cone and a perforated or porous surface on the cone.

8. Apparatus for removing water from compressor inlet air comprising:
   a compressor;
   an air inlet duct to the compressor;
   a drain connecting to the inside of the duct;
   a dam extending into air flow through the duct and a perforated tube in the dam; and
   a suction device for air and/or water connected to the drain.

9. Apparatus for removing water from compressor inlet air comprising:
   a compressor;
   an air inlet duct to the compressor;
   a drain connecting to the inside of the duct, wherein the drain comprises a perforated tube extending across a face of the duct; and
   a suction device for air and/or water connected to the drain.

10. Apparatus according to claim 9 further comprising a dam diverting water to the perforated tube.

11. Apparatus for removing water from compressor inlet air comprising:
    a compressor;
    an air inlet duct to the compressor;
    a drain connecting to the inside of the duct, wherein the drain comprises a perforated strut in the duct; and
    a suction device for air and/or water connected to the drain.

12. Apparatus for removing water from compressor inlet air comprising:
    a compressor;
    an air inlet duct to the compressor;
    a drain connecting to the inside of the duct, wherein the drain is on a non-horizontal wall portion of the air duct;
    a dam extending into air flow through the duct for directing water toward the drain; and a suction device for air and/or water connected to the drain.

13. Apparatus according to claim 12 wherein the dam comprises a strip with a perforated tube in the strip.

14. Apparatus according to claim 12 wherein the dam comprises a strip extending diagonally across the duct and wherein a drain is near the lower end of the strip.

15. Apparatus for removing water from compressor inlet air comprising:
    a compressor;
    an air inlet duct to the compressor;
    a drain connecting to the inside of the duct on a compressor inlet cone within the duct; and
    a suction device for air and/or water connected to the drain.

16. Apparatus according to claim 15 wherein the drain comprises a dam around at least a portion of the compressor inlet cone and a perforated tube adjacent to the dam.

17. Apparatus according to claim 15 wherein the drain comprises a hollow cone and a perforated or porous surface on the cone.

18. Apparatus for removing water from compressor inlet air comprising:
- a compressor;
- an air inlet duct to the compressor;
- an inlet cone for the compressor within the air inlet duct;
- a drain connecting to the inside of the duct on a surface of the inlet cone; and
- a suction device for air and/or water connected to the drain.

19. Apparatus according to claim 18 wherein the inlet cone is hollow and the drain comprises a porous or perforated surface on the inlet cone.

20. Apparatus for removing water from compressor inlet air comprising:
- a compressor;
- hollow inlet air guide vanes for the compressor, wherein the guide vanes have a perforated or porous surface; and
- a suction device for water and/or air connected to the hollow interior of the guide vanes.

21. Apparatus for removing water from compressor inlet air comprising:
- a compressor;
- an air inlet duct to the compressor;
- a hollow inlet cone for the compressor within the air inlet duct, wherein the inlet cone has a perforated or porous surface; and
- a suction device for water and/or air connected to the hollow interior of the inlet cone.

22. Apparatus according to claim 21 wherein only a downstream portion of the inlet cone is porous or perforated.

23. A method of removing water from a compressor inlet air duct comprising:
- sucking water through a perforated tube inside the duct;
- sucking water from the tube with a pressure less than air pressure in the duct adjacent to the tube.

24. A method of removing water from compressor inlet air comprising;
- sucking water from a hollow strut upstream from the compressor with a pressure less than air pressure adjacent to the suction inlet.

25. A method of removing water from compressor inlet air comprising:
- sucking water from a hollow compressor inlet cone within and inlet air duct upstream from the compressor with a pressure less than air pressure adjacent to the suction inlet.

26. A method of removing water from compressor inlet air comprising:
- sucking water from a hollow inlet guide vane upstream from the compressor with a pressure less than air pressure adjacent to the suction inlet.

* * * * *